United States Patent
Togawa

[19]
[11] Patent Number: 6,002,456
[45] Date of Patent: Dec. 14, 1999

[54] PLASMA ADDRESSED LIQUID CRYSTAL DISPLAY APPARATUS

[75] Inventor: Takahiro Togawa, Kanagawa, Japan

[73] Assignee: Sony Corporation, Tokyo, Japan

[21] Appl. No.: 08/602,859

[22] PCT Filed: Jun. 30, 1995

[86] PCT No.: PCT/JP95/01315

§ 371 Date: Mar. 18, 1996

§ 102(e) Date: Mar. 18, 1996

[87] PCT Pub. No.: WO96/00925

PCT Pub. Date: Jan. 11, 1996

[30] Foreign Application Priority Data

Jun. 3, 1994 [JP] Japan .................................... 6-150111

[51] Int. Cl.⁶ .................................................. G02F 1/133
[52] U.S. Cl. ........................ 349/32; 313/587; 315/169.4
[58] Field of Search ............................. 349/32; 313/517, 313/518, 519, 582, 583, 584, 585, 586, 587; 315/169.4

[56] References Cited

U.S. PATENT DOCUMENTS

| | | | |
|---|---|---|---|
| 5,214,521 | 5/1993 | Kwon et al. ............................... | 349/32 |
| 5,221,979 | 6/1993 | Kim ........................................... | 349/32 |
| 5,276,384 | 1/1994 | Martin . | |
| 5,313,223 | 5/1994 | Buzak et al. ............................... | 349/32 |
| 5,349,454 | 9/1994 | Iwama . | |
| 5,453,660 | 9/1995 | Martin et al. ............................. | 313/582 |

FOREIGN PATENT DOCUMENTS

| | | |
|---|---|---|
| 0 567 021 | 10/1993 | European Pat. Off. . |
| 0 588 486 | 3/1994 | European Pat. Off. . |
| 42 23 304 | 4/1993 | Germany . |
| 5 297360 | 11/1993 | Japan . |
| 5 297363 | 11/1993 | Japan . |
| 5 297810 | 11/1993 | Japan . |
| 5 303349 | 11/1993 | Japan . |

*Primary Examiner*—James A. Dudek
*Attorney, Agent, or Firm*—Hill & Simpson

[57] ABSTRACT

A plasma addressed liquid crystal display apparatus includes a first base having plurality of first electrodes arranged substantially in parallel to each other on one principal surface, a second base having plurality of second electrodes arranged substantially in parallel to each other and substantially perpendicular to the first electrodes on the principal surface opposite to the first electrodes on the first base, a dielectric sheet provided between the first and second bases, a liquid crystal layer provided between the first base and the dielectric sheet, a plurality of barriers formed along the second electrodes within a discharge chamber formed between the second base and the dielectric sheet, and a seal member provided in a manner to seal the discharge chamber. In the plasma addressed liquid crystal display apparatus, the spacing between the barriers and the spacing between the barrier positioned nearest to the seal member and the seal member are set to 1.8 mm or less. Thus, in the vacuum evacuation process step and the gas injection process step of the manufacturing process for the plasma addressed liquid crystal display apparatus, the dielectric sheet can be prevented from being cracked or broken. As a result, yield can be improved to greater degree as compared to the conventional apparatus.

2 Claims, 5 Drawing Sheets

PLASMA ADDRESSED LIQUID CRYSTAL DISPLAY APPARATUS

BACKGROUND OF THE INVENTION

1. Field of the Invention

This invention relates to a plasma addressed liquid crystal display apparatus adapted for driving liquid crystal by making use of plasma to thereby display an image (pictorial image).

2. Background Art

As an image display apparatus for driving liquid crystal to carry out display of an image (pictorial image), a plasma addressed liquid crystal display apparatus utilizing discharge plasma is disclosed in the Japanese Patent Application Laid Open No. 265931/1992 publication, etc.

The proposed plasma addressed liquid crystal display apparatus comprises, as shown in FIG. 1, a liquid crystal side glass 12 having a plurality of electrodes 11 arranged in parallel to each other, a base (substrate) glass 14 having a plurality of discharge electrodes 13 arranged in parallel to each other and perpendicular to the electrodes 11, a thin glass plate 15 provided between the liquid crystal side glass 12 and the base glass 14, a liquid crystal layer 16 provided between the liquid crystal side glass 12 and the thin glass plate 15, a plurality of barrier ribs 18 formed on the discharge electrodes 13 within a discharge chamber 17 formed between the base glass 14 and the thin glass plate 15, and frit 19 provided so as to seal the discharge chamber 17.

The liquid crystal side glass 12 is flat and non-conductive, and sufficiently transparent from an optical point of view. A plurality of strip-shaped electrodes 11 are formed on one principal surface of the liquid crystal side glass 12, and a liquid crystal layer 16 comprised of nematic liquid crystal, etc. is disposed in a manner in contact with the electrodes 11. In particular, a plurality of the electrodes 11 formed with a predetermined width on the principal surface of the liquid crystal side glass 12 opposite to the base glass 14 are formed by transparent conductive material, e.g., indium tin oxide (ITO), etc., and are transparent from an optical point of view. In addition, these electrodes 11 are disposed in parallel to each other, and extend, e.g., in a vertical direction of the display screen.

The liquid crystal layer 16 is held between the thin glass plate 15 which is a thin dielectric plate and the liquid crystal side glass 12. A liquid crystal cell is formed by. By the liquid crystal side glass 12, the liquid crystal layer 16 and the thin plate glass 15. This thin glass plate 15 functions as an insulating shielding layer between the liquid crystal layer 16 and discharge chamber 17 which will be described later.

On the other hand, the base glass 14 on which a plurality of the discharge electrodes 13 are formed as a strip-shaped electrode and the thin glass plate 15 are adapted so that their peripheries are sealed by frit 19 as the sealing agent. In addition, a space formed between the base glass 14 and the thin glass plate 15 serves as the discharge chamber 17 for producing discharge plasma.

Respective discharge electrodes 13 are equi-distantly disposed on the base glass 14. Moreover, barrier ribs 18 respectively serving as barriers are formed on these discharge electrodes 13 by printing as described later. The discharge chamber 17 is partitioned by the plurality of barrier ribs 18 so that it is divided into respective plasma chambers $P_1$, $P_2$ ... which form independent discharge channels, respectively.

The discharge electrodes 13 formed on the principal surface of the base glass 14 opposite to the liquid crystal side glass 12 are directly formed on the base glass 14 by a conductive paste including, e.g., silver powder, etc. The discharge electrodes 13 are also arranged in parallel to each other, wherein the arrangement direction thereof is the direction perpendicular to the electrodes 11 formed on the previously described liquid crystal side glass 12. Namely, these discharge electrodes 13 are arranged in a horizontal direction with respect to the display screen. Accordingly, respective plasma chambers $P_1$, $P_2$ ... correspond to e.g., respective scanning lines within the display picture on screen. Ionizable gas is hermetically sealed into the respective plasma chambers $P_1$, $P_2$ .... As such ionizable gas, helium, neon, argon or mixture gas thereof is used.

Barrier ribs 18 are formed on the strip-shaped discharge electrodes 13 for every scanning unit. In particular, the barrier ribs 18 are formed by printing, plural times, in a stacked manner, using glass paste into which ceramic such as alumina, etc. is mixed by the printing method, e.g., the screen printing method, and also serves to limit the distance between the base glass 14 and the thin glass plate 15 (hereinafter referred to as the gap interval of the discharge chamber 17). The gap interval of the discharge chamber 17 can be controlled by adjusting the number of screen printing operations when forming the barrier ribs 18 or the quantity of glass paste at the time of each printing, etc. Ordinarily, the gap interval is to be about 200 μm.

The discharge electrodes 13 function as the anode electrode or the cathode electrode, and discharge electrodes are constituted by pairing these electrodes. In the case where the barrier ribs 18 are formed on the discharge electrodes 13 as described above, each of the discharge electrodes 13 are commonly used for the two adjacent plasma chambers where the respective plasma chambers $P_1$, $P_2$ ... are partitioned by these barrier ribs 18. Namely, e.g., the discharge electrode 13 between the plasma chamber $P_1$ and the plasma chamber $P_2$ serves as both the discharge electrode of the plasma chamber $P_1$ and the discharge electrode of the plasma chamber $P_2$.

A manufacturing process for the above-described plasma addressed liquid crystal display apparatus will be briefly described.

Initially, a plurality of discharge electrodes 13 are made on the glass base 14 by printing so that the barrier ribs 18 can then be stacked on these discharge electrodes 13 Further, frit 19 is coated at the periphery of the glass base 14 to form the discharge chamber 17. Thereafter, thin glass plate 15 is placed onto the upper portions of the barrier ribs 18 is vacuum evacuated the inside of the discharge chamber 17 is vaccum evacuated thereafter to inject gas thereinto.

The thickness of the thin glass plate 15 is about 50 μm. The thin glass plate 15 functions an insulating shielding layer between the liquid crystal layer 16 and the discharge chamber 17 as described above. In the vacuum evacuating process and the gas injection process described above, as shown in FIG. 1, large stresses are applied to the portions indicated by $Q_1$ and $Q_2$ of the thin glass plate 15, i.e., the portions $Q_1$ and $Q_2$ at which the thin glass plate 15 is in contact with the edge portions of the barrier ribs 18. In addition, small cracks, so called micro cracks exist within glass.

Accordingly, in the above-described plasma addressed liquid crystal display apparatus, there was the problem that micro cracks at the portions $Q_1$ and $Q_2$ of the thin glass plate 15 become large by carrying out vacuum evacuation and injection of gas, so the thin glass plate 15 is cracked or broken.

In view of the actual circumstances as described above, an object of this invention is to provide a plasma addressed liquid crystal display apparatus capable of preventing the thin plate glass from being cracked or broken.

DISCLOSURE OF THE INVENTION

A plasma addressed liquid crystal display apparatus according to this invention comprises a first base (substrate) having a plurality of first electrodes arranged substantially in parallel to each other on one principal surface of the first base, a second base having a plurality of second electrodes arranged substantially in parallel to each other and substantially perpendicular to the first electrodes on the principal surface of the first base which is opposite to the first electrodes, a dielectric sheet provided between the first and second bases, a liquid crystal layer provided between the first base and the dielectric sheet, a plurality of barriers formed along the second electrodes within a discharge chamber formed between the second base and the dielectric sheet, and a seal member provided in a manner to seal the discharge chamber. In the plasma addressed liquid crystal display apparatus, the spacing between the barriers and the spacing between the barrier positioned nearest to the seal member and the seal member are set to 1.8 mm or less.

In this case, the dielectric sheet has a thickness of 50 μm or less, and the barriers are formed on the second electrodes, or are formed between the second electrodes. Moreover, the second electrodes include anode electrodes and cathode electrodes, wherein the barriers are respectively formed on the anode electrodes and the cathode electrodes, or the barriers are formed only on the anode electrodes.

In addition, it is more preferable that the spacing between the barriers and the spacing between the barrier positioned nearest to the seal member and the seal member are set to 0.8 mm or less.

BEST MODE FOR CARRYING OUT THE INVENTION

Preferred embodiments of a plasma addressed liquid crystal display apparatus according to this invention will now be described with reference to the attached drawings.

Figure 1:
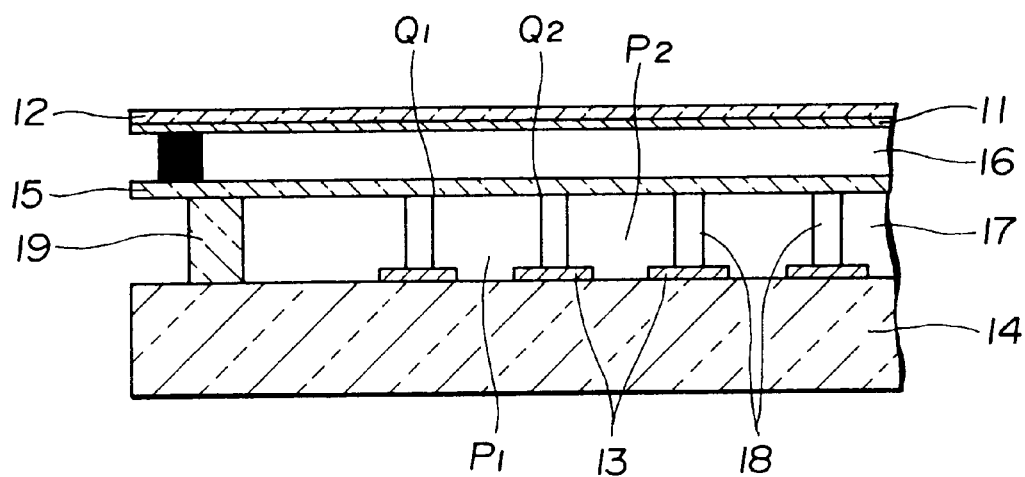
FIG. 1 is a cross sectional diagram showing the configuration of a conventional plasma addressed liquid crystal display apparatus.
Figure 2:
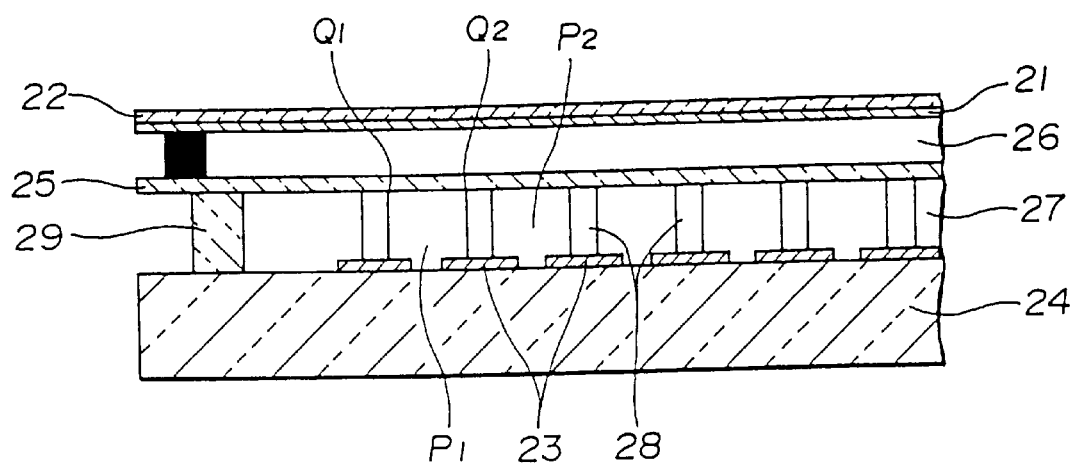
FIG. 2 is a cross sectional diagram showing the configuration of a plasma addressed liquid crystal display apparatus of a first embodiment to which this invention is applied.

The plasma addressed liquid crystal display apparatus to which this invention is applied comprises, as shown in FIG. 2, for example, a liquid crystal side glass 22 having a plurality of electrodes 21 arranged on one principal surface thereof substantially in parallel to each other, a base (substrate) glass 24 having a plurality of discharge electrodes 23 arranged substantially in parallel to each other and substantially perpendicular to the electrodes 21 on the principal surface opposite to the electrodes 21 on the liquid crystal side glass 22, a dielectric sheet 25 provided between the liquid crystal side glass 22 and the base glass 24, a liquid crystal layer 26 provided between the liquid crystal side glass 22 and the dielectric sheet 25, a plurality of barrier ribs 28 formed along the discharge electrodes 23 within a discharge chamber 27 formed between the base glass 24 and the dielectric sheet 25, and a seal member 29 provided in a manner to seal the discharge chamber 27.

The liquid crystal side glass 22 is flat and non-conductive, and is sufficiently transparent from an optical point of view. A plurality of strip-shaped electrodes 21 having a predetermined width are arranged substantially in parallel to each other on the principal surface opposite to the dielectric sheet 25. The arrangement direction of these electrodes 21 is, e.g., a vertical direction of the display screen. In addition, the electrode 21 is formed by transparent conductive material, e.g., indium tin oxide (ITO), etc., and is transparent from an optical point of view.

The liquid crystal layer 26 is comprised of, e.g., nematic liquid crystal, etc., and is put between the liquid crystal side glass 22 and the dielectric sheet 25 in contact with the electrodes 21.

The dielectric sheet 25 is comprised of, e.g., glass in a thin plate form. In order to sufficiently ensure electric coupling between the liquid crystal layer 26 and discharge chamber 27 which will be described later, the thickness of the thin glass plate is to be thin and is of a thickness of, e.g., 50 μm. Namely, so the called liquid crystal cell is constituted by the liquid crystal side glass 22, the liquid crystal layer 26 and the dielectric sheet 25. The dielectric sheet 25 functions as an insulating shielding layer between the liquid crystal layer 26 and the discharge chamber 27.

On the other hand, on the base glass 24, a plurality of discharge electrodes 23 are arranged substantially in parallel to each other substantially perpendicular to the electrodes 21 on the principal surface opposite to the electrodes 21 on the liquid crystal side glass 22. Namely, the arrangement direction of the plural discharge electrodes 23 is, e.g., the horizontal direction of the display screen, and the discharge electrodes 23 are formed at every scanning unit. These discharge electrodes 23 are directly formed as a stripe on the base glass 24 by printing conductive paste including, e.g., silver powder, etc. so that they have a predetermined width.

Further, in the plasma addressed liquid crystal display apparatus of the structure in which the barrier ribs 28 which will be described later are formed on the discharge electrodes 23 as shown in FIG. 2, for example, the discharge electrodes 23 are arranged so that the spacing between barrier ribs 28 and the spacing between the barrier rib 28 and seal member 29 which will be described later become equal to 1.8 mm or less. In this embodiment, the spacing between the barrier ribs 28 is caused to be 0.65 mm, and the spacing between the barrier rib 28 and the seal member 29 is caused to be 1.0 mm.

The base glass 24 on which the plural discharge electrodes 23 are formed as a strip-shaped electrode is sealed and supported at the periphery thereof by the seal member 29, and is disposed with a predetermined spacing from the dielectric sheet 25. The seal member 29 is formed by coating, e.g., powdered glass (frit) so that the thickness becomes equal to a predetermined value. Ordinarily, the thickness of the seal member 29 is caused to be about 200 μm. In addition, a space formed between the base glass 24 and the dielectric sheet 25 serves as the discharge chamber 27 which forms the discharge channels.

The discharge chamber 27 formed between the base glass 24 and the dielectric sheet 25 is partitioned along the discharge electrodes 23, i.e., by a plurality of barrier ribs 28 which are barriers respectively formed on the discharge electrodes 23 as shown in FIG. 2, for example, and is thus divided into independent plasma chambers $P_1$, $P_2$ . . . , respectively. Namely, the barrier ribs 28 are also at formed every scanning unit on the respective strip-shaped discharge electrodes 23. Accordingly, respective plasma chambers $P_1$, $P_2$ . . . correspond to, e.g., respective scanning lines within the display picture on screen. The barrier rib 28 is formed by printing, a plurality of times, in a stacked manner, glass paste into which ceramic, e.g., alumina, etc. is mixed by the printing method, e.g., the screen printing method, and thus the barrier rib also serves to limit the distance between the base glass 24 and the dielectric sheet 25. The spacing between the base glass 24 and the dielectric sheet 25 can be controlled by adjusting the number of screen printing operations when forming the barrier ribs 28 or quantity of glass paste at the time of each printing, etc. Ordinarily, such spacing is to be about 200 μm.

Ionizable gas is hermetically sealed into the plasma chambers $P_1$, $P_2$ . . . that are formed in this way. As such ionizable gas, helium, neon, argon or mixture gas thereof, etc. is used.

In the plasma addressed liquid crystal display apparatus, e.g., a video signal is delivered to the electrodes 21 arranged in a vertical direction with respect to the display screen, and a predetermined voltage is applied across a pair of discharge electrodes 23 within a plasma chamber $P_i$ corresponding to the scanning line to produce plasma discharge within the a plasma chamber $P_i$ to thereby carry out a picture image display.

In more practical sense, the discharge electrodes 23 function as the anode electrode or the cathode electrode in a time series manner by the applied potential. When, e.g., one discharge electrode 23 is grounded (is caused to undergo application of a voltage of 0 volts), and a negative potential is applied to all the remaining discharge electrodes 23, the grounded discharge electrode 23 becomes the anode electrode, and discharge electrodes on the both sides of the grounded discharge electrode 23 become the cathode electrodes. Thus, plasma discharge takes place within the plasma chambers on both sides of the grounded discharge electrode 23. By shifting the discharge electrode 23 to be grounded in order, e.g., in synchronism with the horizontal scanning of a video signal, it is possible to shift the plasma chambers that are subject to the discharge in order in synchronism with the horizontal scanning.

Further, the liquid crystal layer 26 functions as a sampling capacitor of the analog voltages applied to the electrodes 21 formed on the liquid crystal side glass 22, and (arbitrary) plasma chamber $P_i$ functions as a sampling switch. Thus, picture image display is carried out. Namely, the liquid crystal layer 26 can be understood as a model capacitor, which is made up of a capacitive liquid crystal cell formed at the portion where the electrodes 21 and the plasma chamber $P_i$ overlap with each other.

Assuming now that an analog voltage is applied to the discharge electrode 23, a voltage of 0 volts is applied to one discharge electrode 23 as a strobe, and discharge plasma takes place within the plasma chamber $P_i$, the so-called plasma switching operation is caused to take place. Thus, the portion of the dielectric sheet 25 in contact with the plasma chamber $P_i$ and the discharge electrode 23 serving as the anode electrode are placed in the state where they are electrically connected by the discharge plasma. From a viewpoint of the circuit, there results the state equivalent to a state where the capacitor switch is turned ON. As a result, the analog voltage applied to the electrode 21 is applied to the capacitor model. Thereafter, when the plasma discharge is stopped, the capacitor switch is turned OFF. As a result, the analog voltage which has been applied immediately before the capacitor switch is turned OFF is held (stored) in the capacitor model. Also after the discharge plasma has disappeared, for a time period until the next strobe is carried out, i.e., a field time period of the corresponding picture image, there remains the state where the above-mentioned analog voltage is stored in the capacitor model. When the capacitive liquid crystal cell is driven, a picture image based on the video signal is displayed on the plasma addressed liquid crystal display apparatus.

Figure 3:
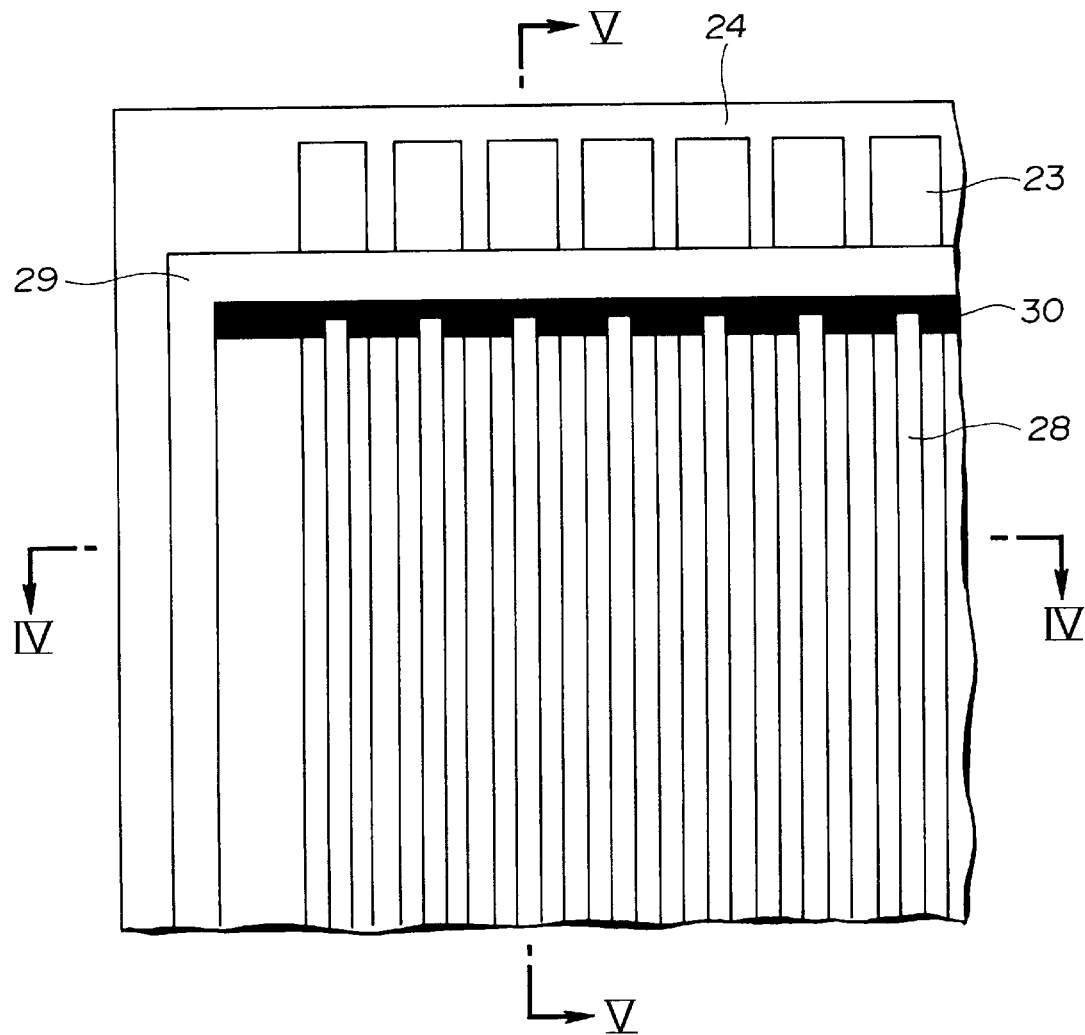
FIG. 3 is a front view showing the configuration of the plasma addressed liquid crystal display apparatus.

A portion of a manufacturing process of the above-described plasma addressed liquid crystal display apparatus in which the barrier ribs are formed on the discharge electrodes will now be described. FIG. 3 is a front view of the plasma addressed liquid crystal display apparatus, FIG. 4 is an enlarged cross sectional view of an essential part when cut along the C–C' lines of FIG. 3, and FIG. 5 is an enlarged cross sectional view when cut along the D–D' lines of FIG. 3.

Figure 4:
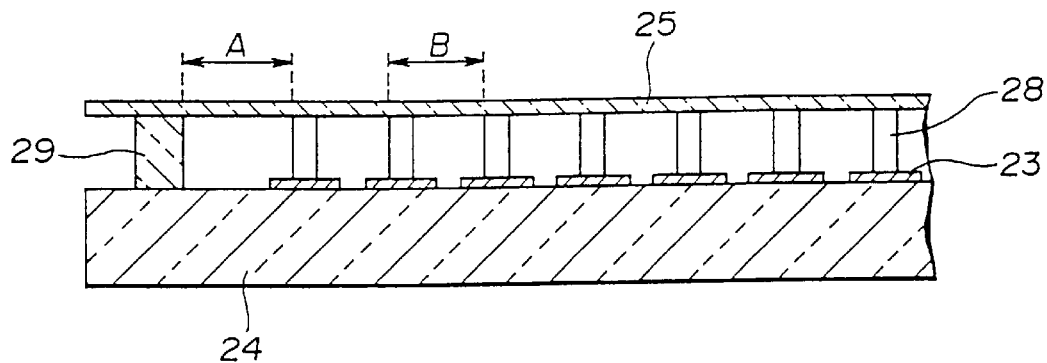
FIG. 4 is a cross sectional diagram showing an essential part of the plasma addressed liquid crystal display apparatus.
Figure 5:
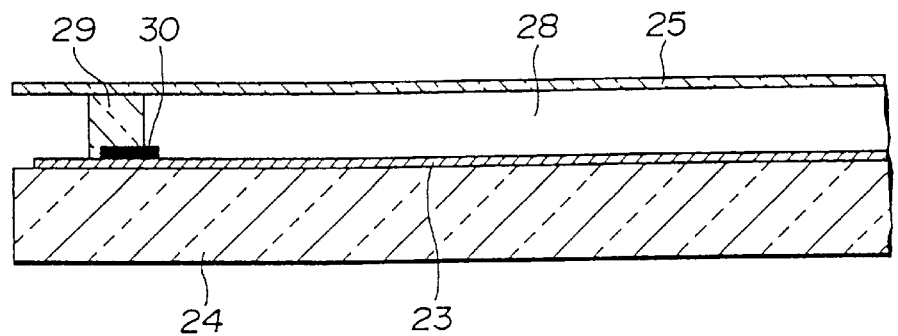
FIG. 5 is a cross sectional diagram showing an essential part of the plasma addressed liquid crystal display apparatus.

Initially, as shown in FIGS. 4 and 5, conductive paste including, e.g., silver powder, etc. is printed on the base glass 24 with a predetermined width and at equal intervals, and is then baked (or fired) to thereby form a plurality of discharge electrodes 23 on the base glass 24. At this time, a plurality of discharge electrodes 23 are formed so that the spacing (interval) A between the barrier rib 28 formed on the discharge electrode 23 at the next process step and the seal member 29 and the spacing between the barrier ribs 28, i.e., the pitch interval B of the barrier rib 28 is equal to 1.8 mm or less. In a preferred embodiment, e.g., the spacing A is set to 1.0 mm and the pitch interval B is set to 0.65 mm.

As shown in FIG. 5, discharge prevention cover 30 (only one is illustrated in the figure) are formed at both end portions of the plural discharge electrodes 23. Further, the barrier ribs 28 are respectively formed on the plurality of discharge electrodes 23 by the screen printing. Glass paste into which ceramic, e.g., alumina, etc. is mixed is printed, in a stacked manner, plurality of times, on the discharge electrodes 23 by the screen printing method so that the thickness becomes equal to about 200 μm to form barrier ribs 28 at intervals of 0.65 mm. Thereafter, the upper portions of the plural barrier ribs 28 thus formed are caused to undergo polishing and baking.

Then, e.g., frit is coated at the periphery of the barrier ribs 28 so that the thickness becomes equal to about 200 μm to thereby form the seal member 29. At this time, the seal member 29 is formed so that the spacing A between the barrier rib 28 and the seal member 29 becomes equal to 1.8 mm or less, i.e., 1.0 mm.

Thereafter, the dielectric sheet 25 is stuck on the upper portions of the barrier ribs 28 to form the discharge chamber 27 consisting of the plasma chambers $P_1$, $P_2$ . . . by evacuating the inside of the discharge chamber 27 to the partial vacuum. Then, ionizable gas such as helium or neon, etc. is injected.

Meanwhile, the thickness of the dielectric sheet 25 consisting of thin the glass plate is about 50 μm as described above. In the vacuum evacuation process and the gas injection process, large stresses are is applied to the portions $Q_1$, $Q_2$ of the dielectric sheet 25 that are in contact with the edge portions of the barrier ribs 28 as shown in the FIG. 2 mentioned above. However, since the pitch interval B of the barrier rib 28 is set to 0.65 mm and the spacing A between the barrier rib 28 and the seal member 29 is 1.0 mm in this embodiment so that these values A and B are both 1.8 mm or less, stresses applied to the thin glass plate are 5 kg/cm$^2$ or less. As a result, there was no possibility that the dielectric sheet 25 will be cracked or broken. Moreover, even if small cracks, such as so called micro cracks, exist within glass, there was no possibility that the micro cracks become large so as to crack or break the dielectric sheet 25. It is to be noted that although the spacing A between the barrier rib 28 and the seal member 29 and the pitch interval B of the barrier ribs 28 change in dependency upon the thickness of the dielectric sheet 25, it is more preferable that they are 0.8 mm or less.

It is to be noted that while, in the above-described embodiment (hereinafter referred to as the first embodiment), the plasma addressed liquid crystal display apparatus is of a structure in which barrier ribs 28 are formed on the discharge electrodes 23, this invention is not limited to this first embodiment, but may be applied to plasma addressed liquid crystal display apparatuses, e.g., of a structure such that dedicated cathode and anode electrodes are respectively provided at the plasma chambers.

Figure 6:
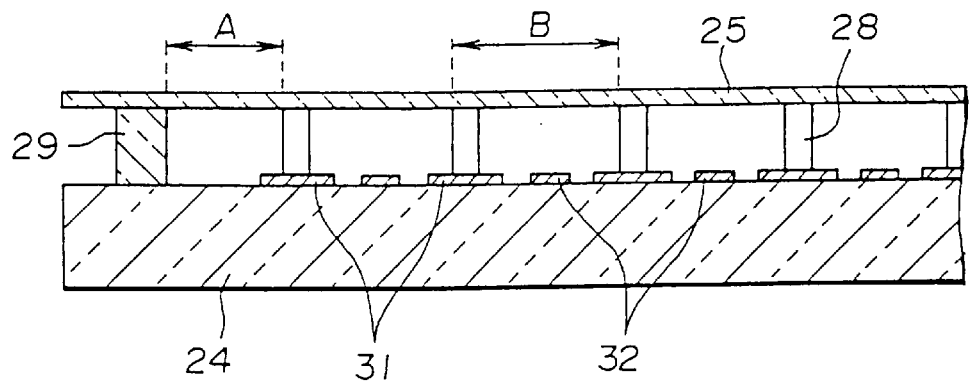
FIG. 6 is a cross sectional diagram showing an essential part of a plasma addressed liquid crystal display apparatus of a second embodiment to which this invention is applied.

A plasma addressed liquid crystal display apparatus of a second embodiment to which this invention is applied comprises, as the essential part thereof which is shown in FIG. 6, for example (see FIG. 2 in connection with the components which are not shown in FIG. 6), a liquid crystal side glass 22 having a plurality of electrodes 21 arranged substantially in parallel to each other on one principal surface, a base (substrate) glass 24 having a plurality of anode electrodes 31 and a plurality of cathode electrodes 32 arranged substantially in parallel to each other and substantially perpendicular to the electrodes 21 on the principal surface opposite to the electrodes 21 on the liquid crystal side glass 22, the dielectric sheet 25 provided between the liquid crystal side glass 22 and the base glass 24, a liquid crystal layer 26 provided between the liquid crystal side glass 22 and the dielectric sheet 25, a plurality of barrier ribs 28 formed on the anode electrodes 31 within the discharge chamber 27 formed between the base glass 24 and the dielectric sheet 25, and a seal member 29 provided in a manner to seal the discharge chamber 27.

Namely, in the plasma addressed liquid crystal display apparatus of the second embodiment, the strip-shaped anode electrodes 31 have a width similar to that of the discharge electrode 23 of the first embodiment, but the strip-shaped cathode electrode 32 is narrower than that of the discharge electrode 23, and the barrier ribs 28 are formed only on the anode electrodes 31. It is to be noted that the same reference numerals are respectively applied to the same components as the components of the plasma addressed liquid crystal display apparatus of the first embodiment, and explanation of their detail and operation will be omitted.

Also in the plasma addressed liquid crystal display apparatus of the second embodiment, the spacing A between the barrier rib 28 and the seal member 29 and the pitch interval B of the barrier rib 28 are set to 1.8 mm or less, e.g., are respectively set to 1.0 mm and 0.65 mm. As a result, in the vacuum evacuation process and the gas injection process, there was no possibility that the dielectric sheet 25 will be cracked or broken.

Figure 7:
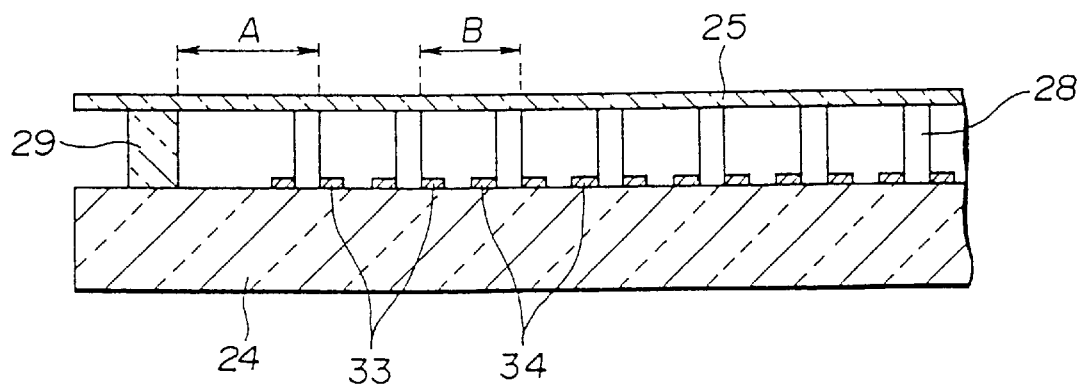
FIG. 7 is a cross sectional diagram showing an essential part of a plasma addressed liquid crystal display apparatus of a third embodiment to which this invention is applied.

Further, a plasma addressed liquid crystal display apparatus of a third embodiment to which this invention is applied comprises, as the essential part thereof is shown in FIG. 7, for example (see FIG. 2 in connection with the components which are not shown in the figure), a liquid crystal side glass 22 having a plurality of electrodes 21 arranged in parallel to each other on one principal surface, a base (substrate) glass 24 having plural anode electrodes 33 and plural cathode electrodes 34 arranged in parallel to each other and substantially perpendicular to the electrodes 21 on the principal surface opposite to the electrodes 21 on the liquid crystal side glass 22, a dielectric sheet 25 provided between the liquid crystal side glass 22 and the base glass 24, a liquid crystal layer 26 provided between the liquid crystal side glass 22 and the dielectric sheet 25, a plurality of barrier ribs 28 formed between the anode electrodes 33 and the cathode electrodes 34 which are adjacent to each other within discharge chamber 27 formed between the base glass 24 and the dielectric sheet 25, and a seal member 29 provided in a manner to seal the discharge chamber 27.

Namely, the plasma addressed liquid crystal display apparatus of the third embodiment is of a structure in which pairs of anode electrodes 33 and cathode electrodes 34 are provided for every respective plasma chamber, and barrier ribs 28 are provided between the anode electrodes 33 and the cathode electrodes 34 which are adjacent to each other within the plasma chambers. It is to be noted that the same reference numerals are respectively applied to the same components as the components of the plasma addressed liquid crystal display apparatus of the first embodiment, and explanation of their detail and operations will be omitted.

Also in the plasma addressed liquid crystal display apparatus of the third embodiment, the spacing A between the barrier rib 28 and the seal member 29 and the pitch interval B of the barrier rib 28 are set to 1.8 mm or less, e.g., are respectively set to 1.0 mm and 0.65 mm. As a result, in the vacuum evacuation process and the gas injection process, there was no possibility that the dielectric sheet 25 will be is cracked or broken.

As apparent from the foregoing description, the plasma addressed liquid crystal display apparatus according to this invention is adapted so that the spacing between plural barriers and the spacing between the barrier positioned nearest to the seal member and the seal member are set to 1.8 mm or less, thereby making it possible to prevent the dielectric sheet from being cracked or broken in the vacuum evacuation process step and the gas injection process step of the manufacturing process for the plasma addressed liquid crystal display apparatus. Thus, yield can be improved to greater degree as compared to the conventional apparatus.

Although other modifications and changes may be suggested by those skilled in the art, it is the intention of the inventor to embody within the patent warranted hereon all changes and modifications as reasonably and properly come within the scope of his contribution to the art.

I claim:

1. A plasma addressed liquid crystal display apparatus, comprising:

a first base having a plurality of first electrodes arranged substantially in parallel to each other on one principal surface of the first base;

a second base having a plurality of second electrodes arranged substantially in parallel to each other and substantially perpendicular to the first electrodes on a principal surface opposite to the first electrodes on the first base;

a dielectric sheet provided between the first and second bases;

a liquid crystal layer provided between the first base and the dielectric sheet;

a plurality of barriers formed along the second electrodes within a discharge chamber formed between the second base and dielectric sheet; and a seal member provided in a manner to seal the discharge chamber;

wherein the second electrodes include anode electrodes and cathode electrodes, the barriers being only on the anode electrodes.

2. A plasma addressed liquid crystal display apparatus, comprising:

a first base having a plurality of first electrodes arranged substantially in parallel to each other on one principal surface of said first base;

a second base having a plurality of second electrodes arranged substantially in parallel to each other on a principal surface of said second base, said second base being disposed opposite said first base so that said second electrodes are substantially perpendicular to said first electrodes on said first base;

a dielectric sheet between said first and second bases;

a liquid crystal layer between said first base and said dielectric sheet;

a plurality of barriers formed along said second electrodes within a discharge chamber formed between said second base and said dielectric sheet, said barriers being spaced from each other by a spacing of approximately 0.65 mm; and a seal member at a perimeter of said discharge chamber to seal said discharge chamber, said seal member being spaced by a spacing of approximately 1.0 mm between said barrier nearest to said seal member and said seal member.

* * * * *